United States Patent [19]

Fowler et al.

[11] Patent Number: 4,761,128
[45] Date of Patent: Aug. 2, 1988

[54] APPARATUS FOR REFORMING A FROZEN CONFECTION SLUG ON A STICK

[75] Inventors: Roscoe T. Fowler, New York, N.Y.; Arthur Hochhauser, Allentown, Pa.; Harold B. Kaufman, Jr., New York, N.Y.; John P. McCarthy, Huntington, N.Y.; Jerry Stockler, Wantagh, N.Y.

[73] Assignee: DCA Food Industries, Inc., New York, N.Y.

[21] Appl. No.: 601,108

[22] Filed: Apr. 18, 1984

Related U.S. Application Data

[60] Division of Ser. No. 196,931, Oct. 14, 1980, abandoned, which is a continuation-in-part of Ser. No. 196,705, Apr. 2, 1980, abandoned.

[51] Int. Cl.⁴ .................. A23G 9/26; B29C 39/04; B29C 43/04
[52] U.S. Cl. .................. 425/126.2; 62/345; 62/380; 425/144; 425/384; 425/385; 425/395; 425/397
[58] Field of Search .................. 425/126 S, 110, 112, 425/116, 117, 383–385, 395, 400, 436 R, 261, 447, 453, 390, 397, 451, 377, 378 R, 507, 511, 517, 217, 144; 53/122, 594; 426/512, 515, 524; 62/345, 38, 380

[56] References Cited

U.S. PATENT DOCUMENTS

| | | | |
|---|---|---|---|
| 1,848,250 | 3/1932 | Harnden | 425/112 |
| 2,173,850 | 9/1939 | Lockwood | 426/306 |
| 2,666,400 | 1/1954 | Vogt | 426/663 |
| 2,803,202 | 8/1957 | Schafer | 426/512 |
| 2,832,299 | 4/1958 | Farr | 425/394 |
| 3,244,121 | 4/1966 | Ellison | 425/217 |
| 4,392,803 | 7/1983 | Cross et al. | 425/126 S |

FOREIGN PATENT DOCUMENTS

| | | |
|---|---|---|
| 0040989 | 2/1981 | European Pat. Off. |
| 831028 | 3/1960 | United Kingdom |
| 2005125 | 4/1979 | United Kingdom |

Primary Examiner—Willard E. Hoag
Attorney, Agent, or Firm—Amster, Rothstein & Ebenstein

[57] ABSTRACT

Apparatus for producing novel three dimensional shaped frozen confection products on a stick. A molded slug of frozen confection having a generic shape is converted into a three dimensional frozen confection having any desired shape including shapes having variable cross-sections and undercut portions. The desired final shape is formed by the application of pressure to the slug, without significant melting of the slug, using a split mold which defines the final three dimensional shape by controlling the temperature of the slug and the relative size and shape of the slug and mold cavity.

12 Claims, 5 Drawing Sheets

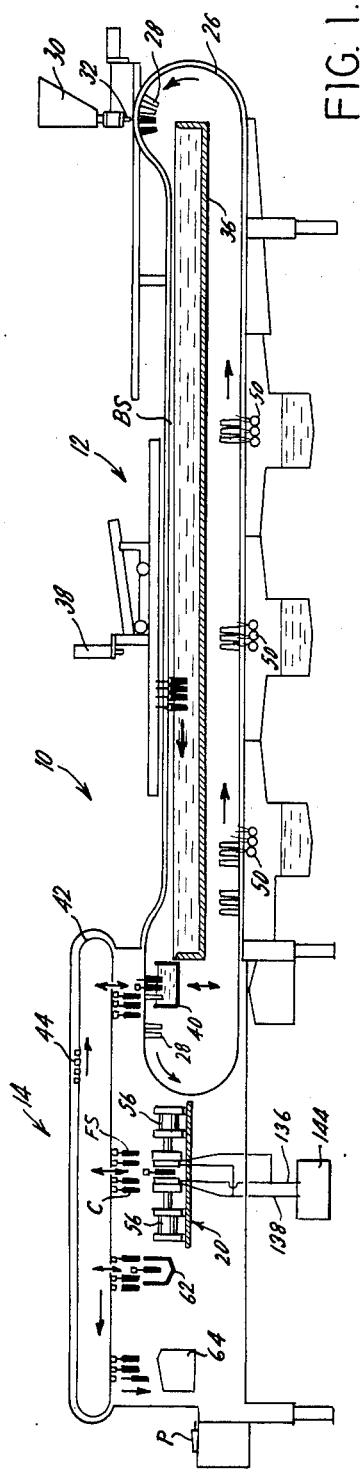
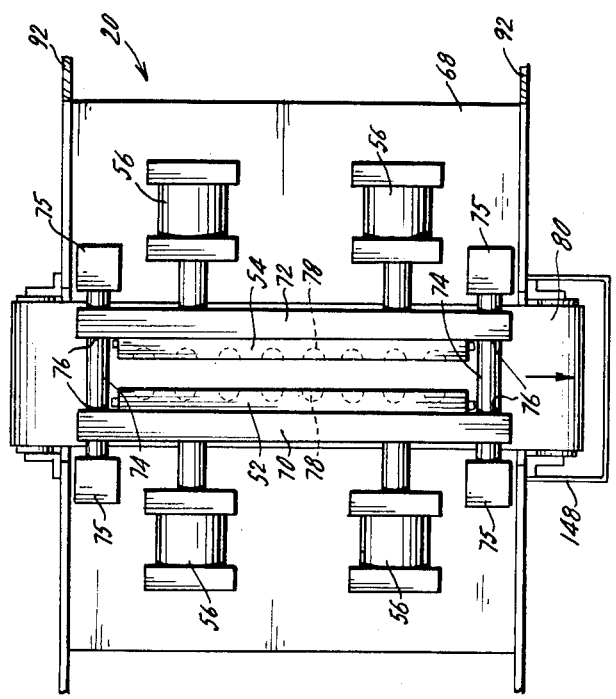
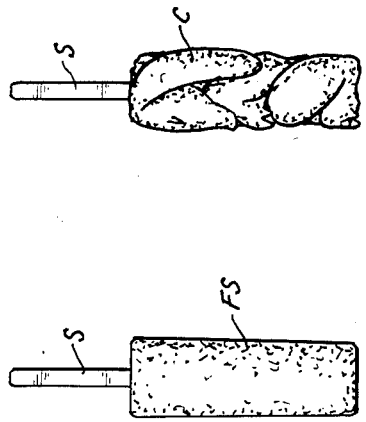
FIG. 1.
FIG. 2.
FIG. 3.
FIG. 4.

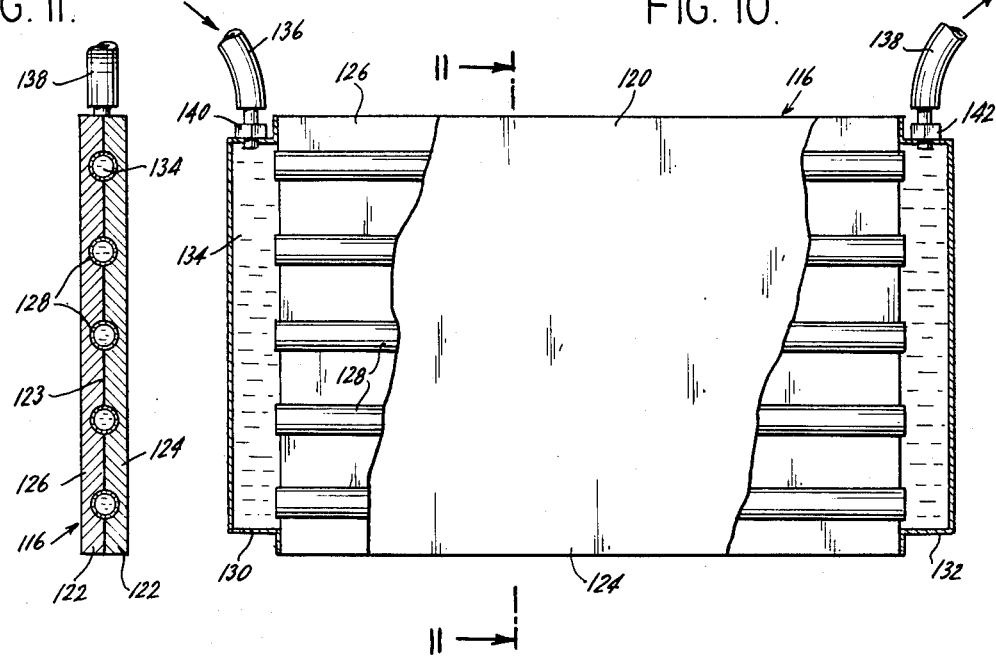
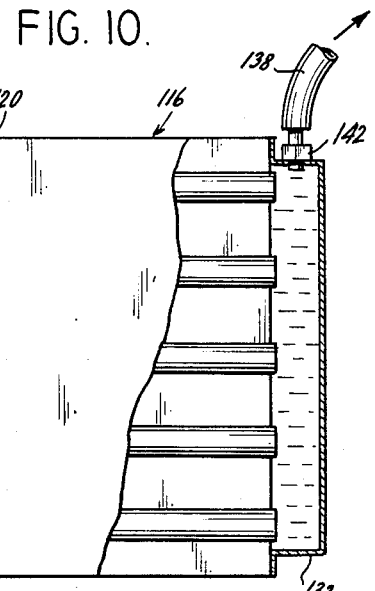
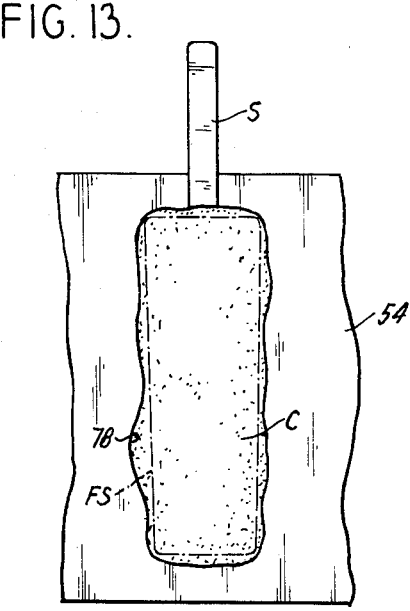
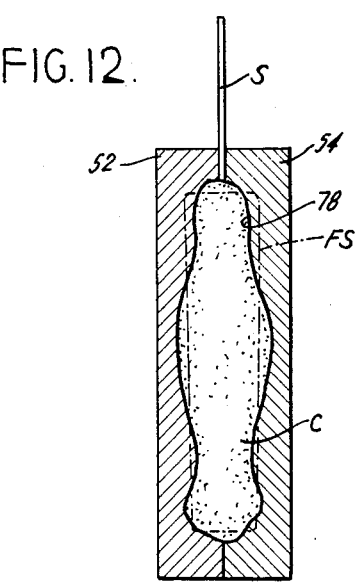

FIG. 15.
FIG. 14.
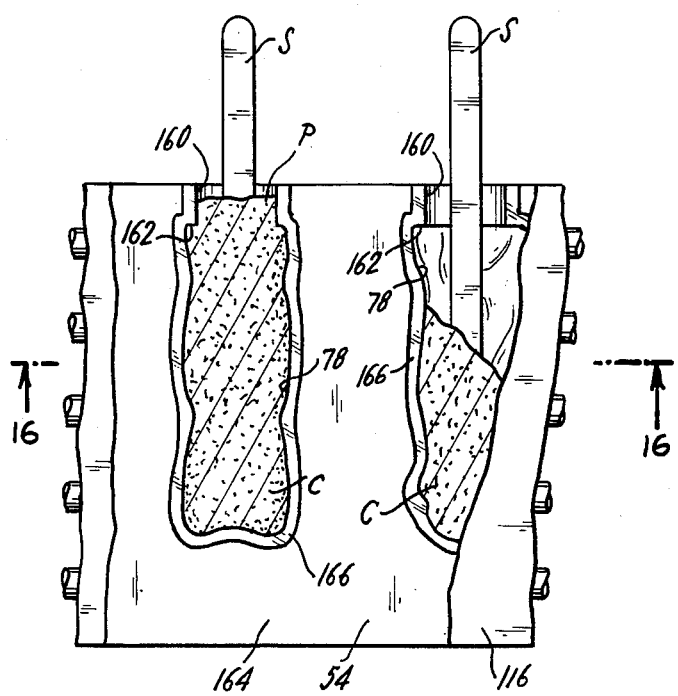
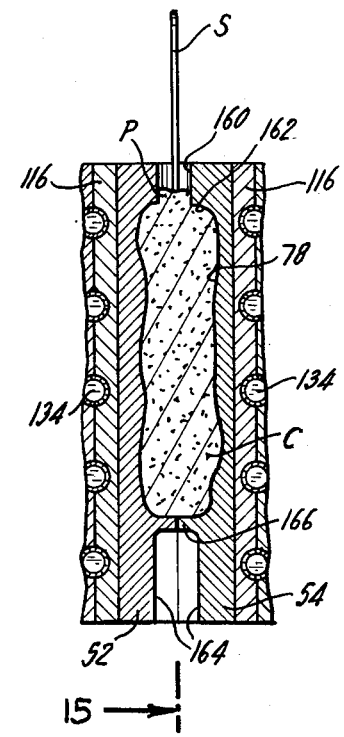
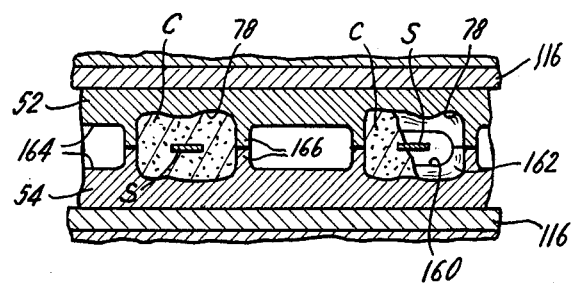
FIG. 16.

APPARATUS FOR REFORMING A FROZEN CONFECTION SLUG ON A STICK

This application is a division of application Ser. No. 196,931 of Oct. 14, 1980, which was a continuation-in-part of application Ser. No. 136,705 of Apr. 2, 1980, both now abandoned.

BACKGROUND OF THE INVENTION

1. Field of the Invention

This invention relates to the formation of three dimensional frozen confections from an already formed frozen confection product. The final shape of the reformed confection can be of almost any desired configuration without regard to whether or not the topmost portion of the confection is wider than the bottom or whether there are undercut portions in the reformed confection. The present invention can be used with frozen confections made of water ice, ice cream, aerated ice cream, ice milk, fudge, puddings, sherbert, frozen yogurt or the like.

Specifically, in the method and apparatus of this invention a slug of frozen confection is molded in a generic or elemental shape in the first position of a conventional high speed frozen confection forming machine. The frozen slug is then reformed by a split mold which defines a cavity that substantially encloses the molded slug causing the frozen material to flow to form the shape of the closed split mold cavity. By careful control of the slug size and shape in relation to the mold cavity and the slug temperature, the finally shaped confection can be produced substantially as the result of the flow of frozen slug material without significant melting and refreezing.

2. Description of the Prior Art

The present invention is specifically adapted to be practiced in conjunction with a conventional frozen confection forming machine which is modified to include a reforming station in the finishing section of the machine which reforms the finished, generically shaped, molded elemental slugs of frozen confection. Conventional confection forming machines are well known in the frozen confection industry and are sold under the trademarks "VITALINE" and "GRAM".

Specifically, the Vitaline machine has a first molding section wherein a first group of side-by-side mold cavities are filled with liquid or semi-solid confection and the mold strips are advanced through a brine tank thereby freezing the confection. During the freezing process, a stick is inserted into the confection and at the end of the first section of the machine, the frozen confections are extracted upwardly from the mold cavities by their respective sticks. In the second section of the machine, the confections are advanced to subsequent stations where a coating or coatings are applied, if desired, and the completed confections are ultimately individually packaged and are available for removal from the machine in their individual packages.

A Gram machine operates in a manner similar to the Vitaline machine, except the first section contains a circular, rather than an elongated brine tank and the mold cavities are carried in a circular path.

Since the frozen confection is removed from the mold in both the Vitaline and Gram machines by simply drawing the stick upwardly, the molds must be shaped such that the molded frozen confection is axially strippable. Such requirement greatly limits the shapes into which the finished products manufactured on such machines can be formed since there can be no undercut surfaces that would interfere with the withdrawal of the frozen confection.

One suggested method of increasing the variety of shapes of frozen confection products produced from machines of the foregoing construction is described in British Pat. No. 2,005,125, published Apr. 19, 1979. This patent discloses a method of decorating frozen confections and apparatus for carrying out the method in conjunction with a Gram confection forming machine. The '125 patent recognizes that the shape in which a frozen confection may be formed on such machine is limited by the requirement that the molded confection be axially strippable and teaches a method of applying undercut decorations to the surface of a frozen confection after removal from the mold by "branding" or stamping the frozen confection with opposed heated stamping tools. Significantly, and contrary to the present invention, the British patent teaches that it is not possible to use unheated stamping tools without crushing the frozen confection. This is consistent with the long held belief by those skilled in the art that frozen confections and particularly quiescently frozen confections are incapable of being compressed to form a shape.

British Pat. No. 2,005,124 discloses a method for merely adding decorations to the surface of a frozen confection and an apparatus for practicing such method. The apparatus is similar to the apparatus disclosed in British Pat. No. 2,005,125, however, in the '124 patent instead of utilizing heated stamping tools, high pressure nozzles held away from the surface of the frozen confection are used to spray a predetermined pattern of contrasting colored liquid against the surface of the frozen confection to form a pattern in the frozen confection. The surface and outline of the axially strippable frozen confection is neither undercut nor changed.

An early attempt to manufacture frozen confection products in shapes having undercut surfaces is disclosed in U.S. Pat. No. 1,891,230. This patent relates to a method of stamping ice cream shapes from a continuous strip of frozen confection rather than from an axially strippable mold shape. The method of the '230 patent also requires that the strip of ice cream be heat treated in a complex manner to form a crust or slightly hardened outer surface which will allow the strip of ice cream to be advanced to a cooperating pair of stamping dies. The temperature of the strip of ice cream must also be carefully controlled to assure that the stamping process will operate satisfactorily. The necessity for precise temperature treatment prevents this process from being commercially or economically feasible.

U.S. Pat. No. 4,104,411 discloses another method of forming shaped frozen confections. The method of this patent however, utilizes a strippable rubber mold. Liquid confection mix is poured into the rubber mold, a stick is inserted and the confection is frozen in a bath. The mold must then be manually stripped off the shaped frozen confection. Such a method does not lend itself to high speed production. Further, it can only be used to produce confections of one particular shape at a time because differently shaped confections would require varying amounts of time in the freezing bath.

Another manner of producing frozen confections in more interesting shapes from an axially strippable mold is disclosed in U.S. Pat. No. 3,996,760. This patent teaches a method and apparatus for producing a frozen confection in a tapered, spiral shape having helical fluting that is rotationally, axially strippable. The apparatus utilizes a modified extracting means that both lifts and turns the confection incident to its removal from the mold. Necessarily, such apparatus is complex and can nevertheless only produce a frozen confection having a spiral form in a particular spiral configuration with a predetermined pitch corresponding to the pitch of the extractor. It cannot successfully demold a frozen confection having undercut surfaces or a nonuniform, three dimensional shape such as an animal.

Yet another known method for forming shaped frozen confections is the process of extrusion. In such method, the confection in a semi-solid state is forced through a shaped nozzle under pressure onto a moving belt or similar advancing means. The freezing process is completed by high velocity cold air directed against the semi-solid confection. Such a process results in a frozen confection product that has a uniform cross-section and cannot produce frozen confections having undercut portions or three dimensional shapes simulating animals.

As is apparent from the foregoing discussion of the prior art until now workers in the art have failed to recognize the possibility that frozen confections could be caused to flow, without significant melting and refreezing to form a desired shape and have resorted to a variety of complicated processes and equipment variations to produce shaped frozen confections.

SUMMARY OF THE INVENTION

The present invention provides a method and apparatus for reforming a molded slug of frozen confection having a generic shape into a finished three dimensional frozen confection having any desired shape including shapes having variable cross-sections and undercut portions and is particularly well suited to the reforming of frozen confections on a stick from an axially strippable, molded, quiescently frozen confection. As generally understood, quiescently frozen confections are sweetened, flavored products which have not been processed or mixed prior to freezing in a manner that develops physical expansion of the confection mix in excess of ten percent (10%). Such confection mix is then frozen without being stirred or agitated. The finished product contains not less than seventeen percent (17%) by weight of total food products under normal United States practices, but may contain less total food solids. As previously noted, heretofore, it was believed that a quiescently frozen confection could not be reformed due to the low flowability of such products and the difficulty in applying and directing the substantial force required to reform the confection while it is maintained in the frozen state.

Additionally, it was heretofore believed that it would not be economically feasible to utilize split molds to form frozen confections from liquid confection mixes since such liquid would leak out of the split mold unless complex and expensive split molds were utilized to keep the liquid confection within the mold and the cooling brine out of the mold.

The method of the present invention involves controlling the temperature of the molded slug prior to reforming and correlating the size and shape of the molded slug to the size and shape of a reforming mold cavity such that the molded confection slug is reformed substantially by the cold flow of confection material while in the frozen state. Fracturing of the frozen confection slug is avoided by a combination of proper core temperature of the confection slug and shaping of the opening in the mold cavity to substantially circumscribe the outline of the molded confection slug. The reforming step is performed without significant loss of material and without substantial melting and refreezing of the frozen confection. Upon completion of the reforming step, the reformed confection is substantially the same weight and volume as the frozen confection slug and substantially fills the reforming mold cavity assuming the shape thereof.

An important feature of the invention is the temperature of the first-formed frozen confection slug. It has been found that the temperature of the core of the frozen slug should be maintained in a range of $-10°$ to $+10°$ F. in order to prevent ejection or crushing of the stick. Reference is made to the core temperature since it is inherent in a molding process utilizing a cooling brine, that the frozen confection slug is cooled from the outer surface inwardly thereby creating a temperature gradient throughout the slug such that the outer surfaces of the slug are at lower temperatures. In one embodiment of the invention, the reforming mold cavity may also be provided with a relief in the area of the stick to allow displaced frozen confection to move upwardly without increasing the incidence of stick ejection.

It is broadly an object of the present invention to provide a method of reforming frozen confection slugs to a three dimensional frozen confection of nonuniform cross-section including undercut portions and to provide an apparatus for practicing such method which is specifically adapted to produce such frozen confections in a high-speed, economical operation.

It is a further object of the present invention to provide a method and apparatus of the type described to produce frozen confection in a wide variety of three-dimensional shapes by reforming a commonly shaped, molded slug of frozen confection material thereby utilizing a common set of molds for forming the slug of frozen confection and a single set of more complex reforming molds.

It is a further object of the present invention to provide a method and apparatus that can be utilized to reform quiescently frozen confections into three dimensional shapes without substantially melting the frozen confection.

In accordance with one embodiment of the present invention, there is provided an improved method of reforming a shaped frozen confection which comprises compressing a frozen confection slug having an elemental shape between the opposed halves of a split mold under a pressure sufficient to cause the frozen confection to assume the shape of the cavity defined by said mold halves without significant melting or refreezing of said slug. The temperature of the core of the molded confection slug is in the range of $-10°$ to $+10°$ F. and the medial cross-section of the slug is of such size that it is substantially circumscribed by the opening in each of the mold halves. The volume of the slug is substantially the same as the volume of the cavity.

In accordance with the apparatus of the present invention, there is provided an improved machine for manufacturing shaped frozen confections on a stick having a first machine section including elemental slug molding means for forming molded elemental slugs of frozen confection with sticks projecting therefrom and a second machine section including at least one work station and a second conveyor means for advancing the slugs of molded confection by the sticks to the work station wherein the improvement comprises frozen confection slug reforming means at the work station. The frozen confection slug forming means has a pair of corresponding mold halves movable from an open position to a closed position encompassing the elemental slugs of confection when in the closed position. Each mold half includes cooperating mold cavities having an opening that substantially circumscribes the medial cross-section of the confection slug and the mold cavities are of substantially the same volume as the volume of the slug so that when the mold halves are closed with sufficient pressure, the reformed confections assume the shape of the mold cavities.

BRIEF DESCRIPTION OF THE DRAWINGS

The above brief description as well as other objects and features and advantages of the present invention will be more fully understood by reference to the following detailed description of the presently preferred but nonetheless illustrative improved equipment and method for forming the shaped frozen confections on a stick of the present invention when taken in conjunction with the accompanying drawings, wherein:

FIG. 1 is a diagramatic representation of a conventional frozen confection forming machine of the Vitaline type incorporating the improved reforming apparatus of the present invention;

FIG. 2 is an enlarged side elevational view of a frozen confection molded in the shape of a typical elemental slug;

FIG. 3 is an enlarged side elevational view of the frozen confection of the present invention which has been reformed into a three dimensional shape having undercut areas and a varying cross-section;

FIG. 4 is a plan view of the reforming station of the present invention;

FIG. 10 is a side elevational view of the heat exchanger utilized at the reforming station with portions broken away;

FIG. 11 is a cross-section of the heat exchanger taken along the line 11—11 in FIG. 10, looking in the direction of the arrows;

FIG. 12 is a cross-section through the central plane of a single mold cavity formed by the pair of cooperating mold halves at the reforming station FIG. 13 is a partial sectional view at the intersection of the mold halves, along the line 13—13 in FIG. 12, looking in the direction shown by the arrows;

FIG. 14 is a fragmentary sectional view taken transversely through the mold cavity in the reforming mold halves;

FIG. 15 is a partial sectional view at the intersection of the mold halves, along line 15—15 in FIG. 14, looking in the direction shown by the arrows; and, FIG. 16 is a partial sectional view taken along the line 16—16 in FIG. 15, looking in the direction shown by the arrows.

DESCRIPTION OF THE PREFERRED EMBODIMENTS

Figure 5:
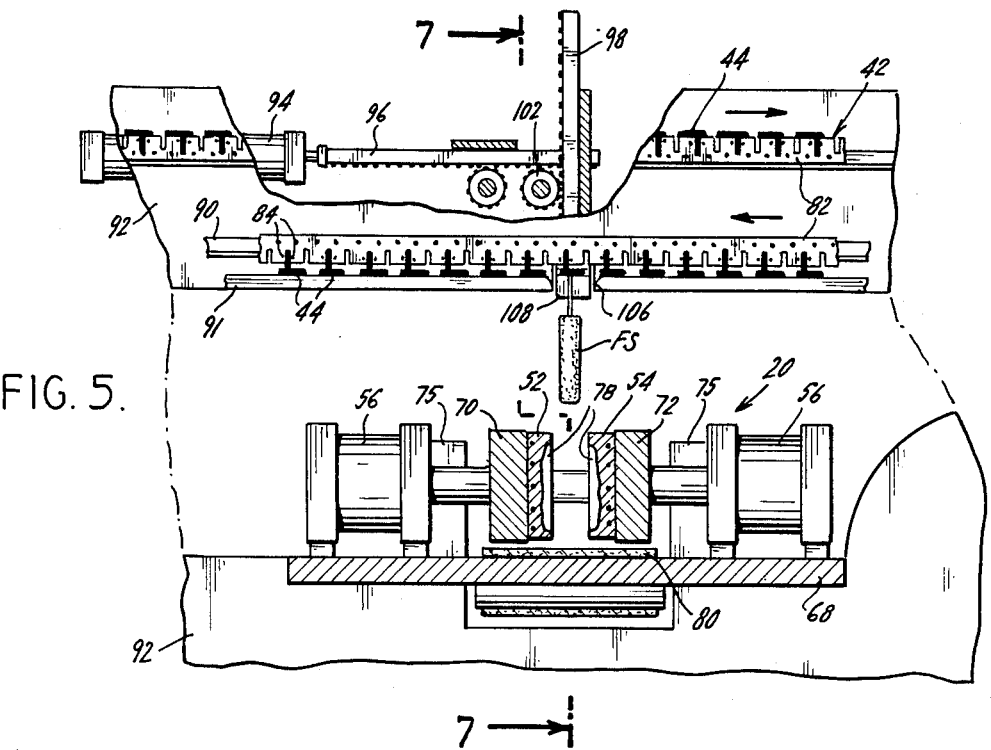
FIG. 5 is a side elevational view of the reforming station as installed in a conventional Vitaline type machine with part of the machine broken away showing the reforming molds in the open position.

Reference will first be made to FIG. 1 for a generalized description of the frozen confection-forming machine modified in accordance with the present invention 10 to manufacture three dimensional frozen confection C, as generally illustrated in FIG. 3, from an elemental or generically shaped frozen slug FS carried by a stick S. Basically, the improved frozen confection machine 10 includes a first section 12 in which standard shaped mold strips are filled, the elemental frozen slugs FS partially frozen and sticks S inserted. After stick insertion the freezing is completed and the elemental frozen confections FS are removed from the first section 12, and transferred to the second section 14 where the shaped frozen confections C are reformed from the elemental frozen slugs FS illustrated in FIG. 2 to any one of a variety of three dimensional shapes as illustrated by FIG. 3 and thereafter further processed (e.g., coated, caked, crumbed, etc.) and finally packaged.

Referring first to the first section 12 of the machine 10, since this section is essentially conventional and is commercially available from various manufacturers, it is only illustrated schematically and diagrammatically. First section 12 includes a continuous first belt conveyor 26 which has an upper course and a lower course and is mounted on the usual end pulleys to be intermittently advanced in the counter clockwise direction as viewed in FIG. 1. Mounted on the first conveyor belt 26 are the usual mold strips 28 which include a common support for a plurality of side-by-side mold cavities. Typically, six, eight, twelve or more mold cavities can be included in a mold strip 28 thereby providing a corresponding number of confection forming cavities which extend across the width of the conveyor belt 26. As the conveyor belt 26 moves stepwise, the mold strips are correspondingly advanced stepwise through first section 12. At a first conventional station, hopper 30 which feeds the appropriate number of nozzles 32, dispenses a predetermined charge of an appropriate mixture for the desired confection into the registering mold cavities which are disposed thereunderneath. The mixture can be widely varied to create a wide range of products including water ice, semi-frozen ices, sherbert, pudding, ice cream, ice milk, yogurt mixes, fudge mixes, etc.

After filling of a particular mold strip 28, it is then advanced through the elongated brine tank 36 which includes the usual brine solution BS, which is maintained at a sufficiently reduced temperature to cause the charges of the ultimate product in the mold strip 28 to completely freeze before the corresponding mold strip 28 is lifted out of the brine tank 36 at the exit end of the conveyor 26, yet maintain the temperature of the core or center of the frozen slug FS at approximately the range of $+10°$ F. to $-10°$ F. Obviously, the rate of travel of the strips through the brine tank 36 or residence time coupled with the appropriate temperature of the brine solution BS will achieve the requisite freezing of the elemental frozen confection slugs FS and maintain the temperature of the core in the appropriate range.

As the mold strips 28 move stepwise through the brine tank, they pass beneath a conventional stick inserter 38 which inserts the sticks S into the frozen slugs FS during a dwell period of the first conveyor 26. The stick inserter 38 is positioned along the length of the brine tank such that the stick S is inserted into the frozen slug FS when the temperature of the core of the frozen slug is in a partially frozen confection (i.e., approximately in the range of 30° to 32° F.). Thus, the stick S can be readily inserted into the frozen slug FS and when the mold strip 28 reaches the exit end of the brine tank 36, the fully frozen slug FS will rigidly maintain the stick S within the slug.

In order to avoid subsequent ejection of the stick S during the reforming operation, it has been found that the depth of stick insertion is critical. For example, when conventional sticks 4½ inches long are used, insertion of the stick to a depth of 2½ to 2¾ inches is a minimum range for conventionally sized frozen confection products approximately 4 inches long or 2½ fluid ounces claimed volume. Prior practice was to insert the 4½ inch long stick to 50% of its length; however, the present invention is best practiced when the stick is inserted more than 50% provided, of course, that a sufficient length of stick extends from the frozen slug FS to allow removal from the mold by the extractor bar. The maximum amount of stick insertion is dependent upon the level of the confection slug FS below the top of the confection forming mold cavities in the mold strip 28. Additionally, the core temperature of the frozen slug FS should not be below −10° F. or deforming or crushing of the stick S may result during the reforming operation. Core temperatures above +10° F. tend to produce reformed products with poor definition and tendency to slip off the stick during finishing operations subsequent to reforming (e.g., coating, packaging, etc.).

At the exit end of first conveyor belt 26, the mold strips 28 are moved upwardly out of the brine solution BS and suspended over a hot water defroster tank 40. Defroster tank 40 is caused to move upwardly during the dwell period of first conveyor belt 26 to facilitate the removal of the frozen confection 22 from the mold cavity.

The second section 14 of machine 10 contains a second conveyor belt 42 which advances intermittently in phase with the first conveyor belt 26. The second conveyor belt 42 advances a plurality of extractor bars 44 in a clockwise direction as shown in FIG. 1. Each extractor bar 44 contains a stick lock device 46 corresponding to the number of frozen slugs FS in the mold strip 28. When an extractor bar 44 is positioned directly above mold strip 28 in defroster tank 40, extractor bar 44 is caused to move downwardly during the dwell period of second conveyor belt 42 so that each stick lock device 46 (see FIG. 7) engages a stick S projecting from each frozen slug FS in the mold strip 28. Extractor bar 44 then moves upward rapidly while both the first conveyor belt 26 and the second conveyor belt 42 are still in their synchronized dwell periods thereby extracting the frozen slug assembly FS (see FIG. 2) from each mold cavity in mold strip 28.

As in a conventional Vitaline machine, the first conveyor belt 26 continues to move intermittently in a counterclockwise direction as shown in FIG. 1 causing mold strips 28 to be inverted and to move past washing and rinsing stations 50 where the mold strips 28 are sterilized and are subsequently presented below hopper 30 where they are refilled with confection mix as the operation of the first section 12 of machine 10 continues.

In the second section 14 of machine 10, each frozen slug FS is suspended from a stick lock device 46 in extractor bar 44 with the frozen slug FS hanging downwardly from stick S and advanced intermittently therethrough by the second conveyor belt 42.

Extractor bar 44 is advanced to a position directly above the lateral medial plane of reforming station 20 of the present invention. During a dwell period of the second conveyor belt 42, extractor bar 44 is caused to move downwardly locating the frozen slug FS precisely between first and second mold halves 52, 54. As more fully described below, mold halves 52, 54 are caused to move together by hydraulic cylinders 56, encompassing each of the frozen slugs FS suspended from extractor bar 44, reforming each frozen slug FS into a shaped confection C (FIG. 3) on a stick S in any of a wide variety of three-dimensional shapes. The reforming process is completed and extractor bar 44 and suspended shaped confections C are caused to move upwardly back into horizontal alignment with the other extractor bars 44 carried by second conveyor belt 42. As more fully described below, the entire reforming operation is accomplished during the dwell period of second conveyor belt 42.

Subsequent to the reforming operation, shaped confections C are advanced to one or more dipping and/or coating stations 62 where extractor bar 44 again moves through the downward and upward cycle back into alignment with the other extractor bars 44 during a subsequent dwell period of second conveyor belt 42.

Finally, second conveyor belt 42 advances extractor bar 44 to a bagging station 64 where the shaped confections C are packaged and a completed frozen confection product P is delivered to the end of second section 14 of machine 10. Second conveyor belt 42 continues to advance intermittently in a clockwise direction until it reaches a portion directly above defroster tank 40 and the operation of second section 14 of machine 10 is repeated.

The present invention can be incorporated within an otherwise conventional frozen confection forming machine 10 such as the Vitaline type by merely lengthening the second section 14 of the machine 10 to accommodate the apparatus of reforming station 20. The diagramatic representation of a Vitaline type machine in FIG. 1 shows the relative orientation of the reforming station to the remainder of an otherwise conventional machine. The reforming station 20 operates in synchronization to the movement of the first and second conveyor belts 26, 42 with the reforming operation occurring during the short dwell period in the motion of the conveyor belts 26, 42. During this dwell period, the apparatus described below associated with the second conveyor belt 42 must also lower and raise the extractor bar 44. At the same time, the respective extractor bars 44, located directly above the other work stations, such as the dipping and/or coating station 62, are also lowered and raised.

Figure 6:
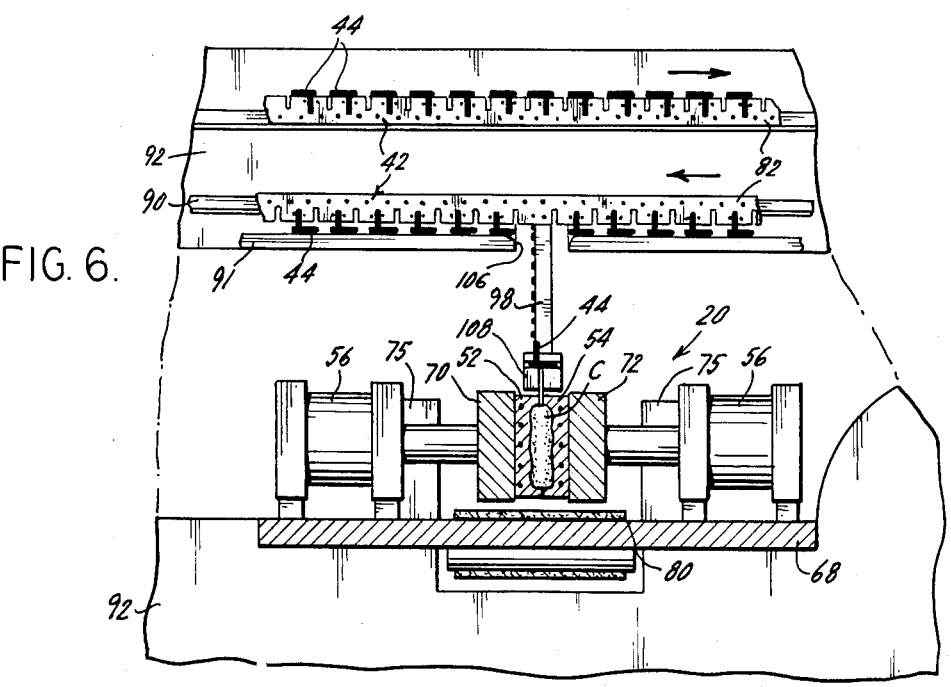
FIG. 6 is a side elevational view of the reforming station showing the reforming molds in the closed position.
Figure 8:
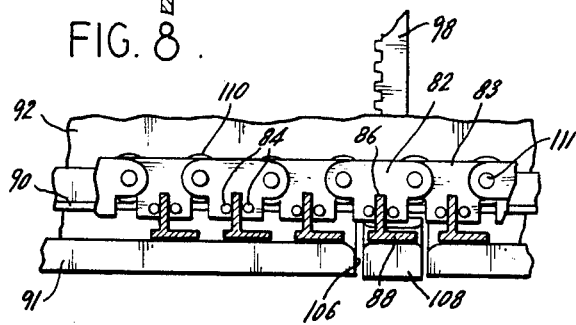
FIG. 8 is a fragmentary side elevational view of the conveying means in the second portion of the machine in partial section, taken along the line 8—8 in FIG. 7, looking in the direction of the arrows.

The improved apparatus of the present invention relies upon the existing mechanisms in the second section 14 of the machine 10 to lower the extractor bar 44 to place the frozen slugs FS into operative relationship with reforming station 20 during the dwell period in the operation of second conveyor belt 42. As best shown in FIGS. 5 and 6, second conveyor belt 42 is formed from a plurality of individual links 82, 83 (see FIG. 8) connected by pins 111. Rollers 110 are rotatably mounted to links 82, 83 on pins 111. Each link 82, 83 contains a pair of bar engaging pins 84 which extend laterally inward from links 82, 83 and engage the upstanding portion 86 of extractor bar 44. The outermost portion of each extractor bar 44 has a horizontal portion 88 and an upstanding portion 86 extending from horizontal portion 88 to form an L-shaped cross-section for a short distance from the outer ends of each extractor bar 44.

Second conveyor belt 42 advances the plurality of extractor bars 44 by the contact of engaging pins 84 against upstanding portion 86 of extractor bar 44. The bottom portion of the extractor bar slides along an L-shaped bracket 90 mounted to the inside surface of housing 92 of second section 14 of machine 10.

A conventional Vitaline machine has a master air cylinder 94 which is mounted for horizontal actuation and causes horizontal rack 96 to move fore and aft once during each dwell period of second conveyor belt 42. The horizontal motion of horizontal rack 96 is translated to reciprocating vertical motion of vertical rack 98 through pinion gears 100, 102 journaled to shaft 104. By the use of a single horizontal rack 96 in conjunction with the appropriate number of pinion gears 100, 102 and associated vertical racks 108, it is possible to precisely synchronize the vertical motion of the respective vertical racks located at each work station.

Bracket 90 extends through the entire length of second section 14 of machine 10 along each side housing 92, 92 and provides a path along which rollers 110 move through the second section 14. Side rail 91 is located directly below bracket 90 along each side housing 92, 92. At each work station and, in particular, directly above the lateral medial plane through reforming station 20, each side rail 91 contains a cut out portion 106 of width substantially equal to the width of horizontal portion 88 of extractor bar 44. An extractor bar carrier block 108 is mounted to the bottommost portion of vertical rack 98. Carrier block 108 extends from vertical rack 98 through a vertical slot formed in housing 92 into engaging relationship with horizontal portion 88 of extractor bar 44 as the extractor bar is advanced to a position directly above reforming station 20. Projecting pins 84 of second conveyor belt 42 engage the upstanding portion 86 of extractor bar 44 causing the extractor bar to slide along side rail 91 into notch 112 formed in carrier block 108. When the second conveyor belt 42 reaches a dwell period, horizontal portion 88 of extractor bar 44 remains stationary within the notch 112 of carrier block 108. In this orientation, as vertical rack 98 and carrier block 108 connected thereto move downward, extractor bar 44 is also caused to move with the carrier block 108.

FIG. 5 shows the portion of a particular extractor bar having a frozen slug FS suspended therefrom in the orientation at the beginning of the dwell period of second conveyor belt 42. In FIG. 6, extractor bar 44, carried by carrier block 108, is at the bottom extent of vertical travel, its orientation at approximately the midpoint of the dwell period of second conveyor belt 42. In this position, the first and second mold halves 52, 54 are in encompassing relationship to the frozen slug FS suspended from stick S thereby forming frozen confection C.

Referring more specifically to the construction of the reforming station 20 of the present invention, as shown in FIG. 4, reforming station 20 has a mounting plate 68 upon which four hydraulic cylinders 56 are fixedly mounted. When confection slug FS is lowered by extractor bar 44 to the proper orientation relative to first and second mold halves 52, 54, all four hydraulic cylinders 56 are simultaneously actuated causing first and second mold backing plates 70, 72 to move toward each other. Mold backing plates 70, 72 move along guide bars 74, 74. Each guide bar 74 is supported by a pair of guide bar blocks 75, 75. As mold backing plates 70, 72 move toward each other, circular bores 76, 76 in mold backing plates 70, 72 slidingly encompass guide bars 74, 74 to prevent lateral motion of first and second mold backing plates 70, 72 relative to mounting plate 68. Hydraulic cylinders 56 are dual action cylinders to allow rapid compression and release of first and second mold backing plates 70, 72 and the associated first and second mold halves 52, 54 mounted thereon to accomplish the reforming operation during the dwell period in the motion of second conveyor belt 42.

Each mold half 52, 54 contains a plurality of mold cavities 78 corresponding to the number and spacing of side-byside confection slugs FS suspended from stick lock devices 46 in extractor bar 44. Consequently, when vertical racks 98, 98 carrying an extractor bar move downwardly and the frozen slugs FS come into operative relationship with first and second mold halves 52, 54, each frozen slug FS is aligned with an individual mold cavity 78.

Figure 7:
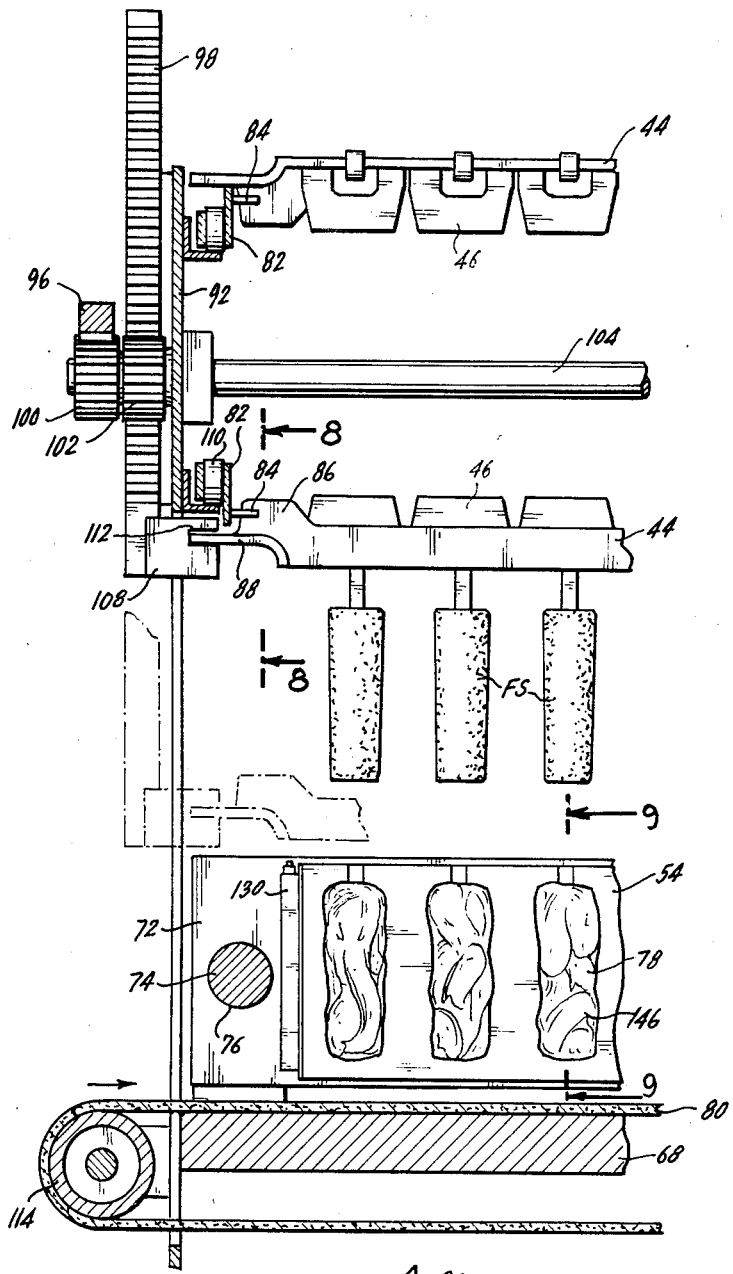
FIG. 7 is a transverse sectional view through a medial plane of the reforming station along the line 7—7 in FIG. 5, looking in the direction of the arrows.

FIG. 7 is a lateral sectional view through the medial plane of reforming station 20 looking upstream at the second section 14 of machine 10. The topmost portion of FIG. 7 has been offset downstream and a small distance to show a view of a segment of extractor bar 44 and the associated structure for raising and lowering the extractor bar. The solid lines of FIG. 7 show extractor bar 44 in the position of FIG. 5 and the phantom lines show the extractor bar 44 in the orientation of FIG. 6 at the lower extent of its vertical travel.

During the reforming operation at reforming station 20, some frozen confection material may exceed the capacity or configuration of the corresponding mold cavity 78, 78. This excess configuration, known as flashing, falls to the bottom of reforming station 20. A flashing removal conveyor belt 80 carries the flashing from directly beneath the first and second mold halves 52, 54 to a pick up area at the side of molding plate 68 from where the flashing is recycled into the process for reintroduction by the hopper 30 in first section 12 of machine 10.

As shown in the lower portion of FIG. 7, flashing removal conveyor belt 80 rotates clockwise relative to mounting plate 68 over a pair of conveyor rollers 114, 114 (only one shown). A segment of second mold half 54 containing three mold cavities 78 is shown.

In order to prevent the entrapment of flashing and to facilitate the removal of flashing that may otherwise prevent the complete closure of the first and second mold halves 52, 54, the surfaces of the mold halves can be provided with reliefs or recessed areas. Such reliefs allow flashing to be more readily recycled without interfering with the operation of the mold halves. The surfaces of the mold halves are maintained at sufficiently elevated temperatures relative to the product by the heat exchanger to facilitate removal and recycling of flashing.

Figure 9:
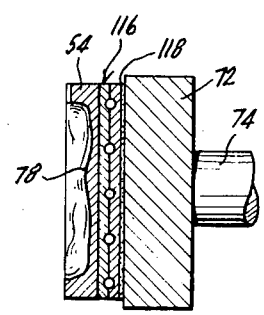
FIG. 9 is a side elevational view of one of the reforming assemblies taken along the line 9—9 in FIG. 7, looking in the direction of the arrows.

As shown in FIG. 9, second mold half 54 is not directly mounted to second mold backing plate 72, but instead is first placed in contact with heat exchanger assembly 116 which is separated from second mold backing plate 72 by thermal insulator 118.

The partial section view of FIG. 10, shows a typical construction for heat exchanger assembly 116. The heat exchanger is constructed of first and second heat exchanger body portions 120, 122, respectively, having smooth outer surfaces 124, 126. The inner surfaces of first and second heat exchanger body portions 120, 122 each contain a plurality of corresponding semi-cylindrical grooves which receive a plurality of hollow tubes 128. The rate of heat transfer between the tubes 128 and heat exchanger body portion 120, 122 is enhanced by the use of temperature conducting cement 123 such as the type sold under the trademark "Thermon" between all surfaces. Temperature conducting cement 123 may also be applied between the mating surfaces of first and second heat exchanger body portions 120, 122 (FIG. 11). One end of heat exchanger assembly 116 contains inlet header 130 and the other end outlet heater 132. The entire assembly is fabricated by brazing, dip soldering or another conventional means of assembly.

Heat exchanger fluid 134 enters the heat exchanger assembly 116 through inlet pipe 136 leading to inlet fitting 140 and exits from heat exchanger assembly 116 through outlet pipe 138 and outlet fitting 142. The temperature of heat exchanger fluid 134 is regulated and adjusted by a conventional system heat exchanger 144, shown schematically in FIG. 1. The purpose of the heat exchanger assembly 116 is to insure that the surfaces 146 of mold cavities 78 in first and second mold halves 52, 54 are maintained at a proper temperature to accomplish release of the reformed frozen confection C from the mold without undue melting of the surface of frozen confection 60.

It has been found that just prior to the remolding step the average core temperature of the frozen confection slug FS should be approximately in the range +10° F. to −10° F.

The temperature of mold cavity 78 should be sufficiently high to form a thin layer of liquid confection along the surface 146 of mold cavity 78 which will enhance the release of the reformed frozen confection C from mold cavity 78. However, it is critical that this thin layer of liquid be prevented from refreezing prior to the opening of mold halves 52, 54.

The temperature of the surface of cavity 78 is maintained in the proper range by the heat exchanger fluid 134 which supplies sufficient heat to the first and second mold halves 52, 54 to replace the amount of heat taken out of the mold by the frozen confection and to maintain the surface of cavity 78 at a high enough temperature to prevent refreezing of the thin layer of melted confection during reforming.

One example of an operative construction of a heat exchanger assembly 116 is shown in FIGS. 10 and 11. The dimension of such heat exchanger 116 and the operating parameters of the equipment using such heat exchanger are provided below. The inside diameter of each tube 128 is .276 inch and each heat exchanger body portion is formed of an aluminum plate ⅜" thick, the appropriate temperature on the surface 146 of mold cavity 78 is obtained by a flow rate of 14 to 20 gallons per minute of heat exchanger fluid 134. The input temperature of heat exchanger fluid 134 is dependent upon the type of frozen confection that is being reformed. For high solid content confection such as ice cream, the temperature of heat exchanger fluid 134 is adjusted so that the temperature of the heat exchanger fluid 134 exiting the heat exchanger assembly 116 through the pipe 138 is approximately 50° to 60° F. When quiescently frozen confection is used, best results have been obtained by introducing heat exchanger fluid 134 into heat exchanger assembly 116 at a temperature that will result in the heat exchanger fluid 134 exiting from the heat exchanger assembly 116 at 90° to 100° F. The actual temperature that will result in the optimum production of reformed frozen confection C will also be dependent upon other variables including film resistance between the surface 146 of mold cavities 78 and the frozen confection C, heat loss or gain through thermal insulator 118, or heat loss or gain through the piping connecting the system heat exchanger 144 to heat exchanger assembly 116 Under some circumstances, the system heat exchanger 144 will be required to cool the heat exchanger fluid 134 if, for example, heat pick-up from ambient air is greater than the heat removed by the frozen confections. Also, it may be necessary to reduce the temperature of the heat exchanger fluid 134 during production start-up to lower the temperature of the surface of the mold cavities 78.

An alternate construction of mold halves 52, 54 is shown in FIG. 4. This construction incorporates the heat exchanger into the structure of mold halves 52, 54. In such configuration, the tubes are located within the solid portion of the mold halves 52, 54.

A sufficient flow rate of heat exchanger fluid 134 is required to assure that there is a uniform temperature or only a very small temperature gradient along the length of heat exchanger assembly 116 between inlet pipe 136 and outlet pipe 138. It is important to avoid a significant temperature gradient to assure that all reformed confections C will be substantially uniform in surface detail and ease of removal from the mold cavities 78 throughout the entire length of first and second mold halves 52, 54.

The heat exchanger fluid 134 can be a water solution containing 10% propylene glycol or any other conventional solution. Heat exchanger fluid 134 is pumped through heat exchanger assembly 116 by a pump having a flow rate and pumping pressure that is correlated to the configuration of the actual heat exchanger assembly utilized to assure that the change in temperature of the heat exchanger fluid 134 between the inlet and the outlet of the heat exchanger assembly 116 is small enough to avoid difference in effectiveness of the reforming operation between the leftmost and rightmost cavities the first and second mold halves 52, 54. A large temperature difference could result in excessive melting of the confection on the inlet end of the mold halves 52, 54 and refreezing and sticking of the confection reformed at the outlet end of the mold halves.

For most effective operation of the reforming station 20, the frozen confection slug FS, whose outline is shown by the dotted lines in FIG. 12, has a vertical dimension less than the vertical dimension of mold cavity 78 within first and second mold halves 52, 54 (shown by the solid line in FIG. 12). Similarly, the periphery of mold cavity 78 in each mold half 54, as shown by the solid line in FIG. 13, substantially circumscribes the cross sectio of the transverse medial plane of the elemental shape of frozen confection slug FS, whose outline is shown by the dotted lines in FIG. 13. Consequently, as first and second mold halves 52, 54 close around frozen confection slug FS during the reforming process, a minimum amount of frozen confection will be outside the mold cavities 78, 78 thereby minimizing the amount of flashing formed during remolding.

To the extent that any flashing is formed, the flashing will enter into the relief area of the die face and then drop off the mating faces of first and second mold halves 52, 54 onto flashing removal conveyor belt 80. As best shown in FIG. 4, flashing removal conveyor belt 80 transports flashing to a flashing recycling receptacle 148 where it is collected and directed back to hopper 30 for recycling through the first section 12 of the machine 10.

To assure that the remolded frozen confection C has a smooth surface appearance with a minimum of inclusions, the combined volume of mold cavity 78, 78 in first and second mold halves 52, 54 must be approximately the same as the volume of frozen confection in frozen slug FS prior to reforming. It has been found, however, that due to the presence of air or "overrun" in some confections such as ice cream or sherbert, the weight of the confection in the frozen slug FS prior to remolding will be substantially equal to the weight of the reformed confection C although there may be a difference in the respective volumes. If the volume of frozen confection of the frozen slug FS is too much greater than the volume of mold cavity 28, 28, an excess of flashing will be formed, in some cases interfering with the complete closure of mold halves 52, 54. Conversely, if the volume of the frozen confection in frozen slug FS is substantially less than the volume of mold cavities 78, 78, the reformed frozen confection 60 will have some undesirable inclusions or air spaces.

In order to make the most attractive reformed frozen confection products, it is desirable to control the overall thickness or depth of the mold cavities 78 relative to the configuration of the frozen slug FS. Specifically, it has been found that the most desirable product is produced by assuring that the thickness of the reforming mold cavities 78 are generally less than the thickness of the frozen slugs FS.

It has been found that ejection of the stick S is also avoided by the inclusion of a recessed area at the top portion of each mold cavity 78. As best shown in FIGS. 14 and 15, the stick recess 160 is formed in each of the first and second mold halves 52, 54. The stick recess 160 may be elliptical in cross-section so that when first and second mold halves 52, 54 are closed, a cylinder of substantially eliptical cross-section is formed communicating between the top surfaces of the first and second mold halves 52, 54 and the inside of mold cavity 78. The depth or circumference of stick recess 160 is smaller than the depth or circumference of the top portion of mold cavity 78 adjacent the stick recess 160 so that an annular, upper cavity shoulder 162 defines the upper boundary of each mold cavity 78 (see FIG. 16). During the reforming operation, upper cavity shoulder 162 causes the confection comprising the frozen slug FS to be retained within mold cavity 78 and only allows a small portion of excess confection to be displaced or reformed around stick S in the area of stick recess 160. It has been found that the use of such stick recess 160 minimizes the instances of ejection of stick S during the reforming process and, at the same time, causes a pedestal P to be formed at the base of the shaped confection which is pleasing in appearance.

In order to prevent the excess build-up of flashing during the reforming process, each of the first and second mold halves 52, 54 may alternatively be constructed in the manner best shown in FIGS. 14 and 16 to include large relief areas 164 on the outermost or mating surfaces of the first and second mold halves 52, 54. When forming first and second mold halves 52, 54, it is possible to remove approximately one-half the thickness of each of the first and second mold halves 52, 54. When a heat exchanger 116 is utilized in conjunction with first and second mold halves 52, 54 and the heat exchanger fluid 134 is at the typically elevated temperature, the thinner section of material in each of the first and second mold halves 52, 54 will have a slightly elevated surface temperature thereby enhancing the removal of flashing from the area of the first and second mold halves 52, 54.

It has been found that the mold cavities 78 retain sufficient rigidity as long as the wall 166 of the mold cavity 78 is at least approximately $\frac{1}{8}$" thick around the circumference of mold cavity 78.

For the sake of illustration, the right-most mold cavity 78 in FIGS. 15 and 16 is shown only partially filled with frozen confection.

The machine of the present invention is particularly useful because only a single set of complex molds is required. The mold strips 28 in the first section 12 of machine 10 are of conventional configuration. There is no requirement that special mold cavities be used to form the elemental slugs of frozen confections FS. Instead, the volume of configuration of mold cavities 78 in first and second mold halves 52, 54 are sized in accordance with the guidelines set forth above to assure that they are coordinated with the dimension of the frozen confection slugs FS formed from mold strips 28 to reform shaped confections C with a minimum of surface irregularities and flashing.

It is desirable to produce a variety of reformed shapes on the same machine, it is possible to utilize first and second mold halves 52, 54 containing a plurality of different shaped mold cavities 78. In order to produce substantially identical confections, the first and second mold halves 52, 54 will contain mold cavities 78 shaped alike. In either case, the same mold strips 28 are utilized in the first section 12 of machine 10 to produce uniform frozen confection slugs FS.

In operation, the method of the present invention is as follows:

First, a plurality of side-by-side frozen confection slugs FS are formed in the first section 12 of a conventional frozen confection forming machine in mold strips 28. The mold strips 28 are moved through a brine solution BS and prior to freezing of the confection slugs FS, sticks S are inserted therein to form frozen confection slug assemblies. The frozen confection assemblies FS complete their travel through the first section 12 of the machine 10 and become fully frozen. Next, an extractor bar 44 containing a plurality of stick lock devices 46 and advanced by a second conveyor belt 42 engage the sticks S projecting from the side-by-side frozen confection slugs FS and removes the slugs FS from mold strips 28 by withdrawing thereby transferring the confection assemblies from the first section 12 of machine 10 to the second section 14. The plurality of side-by-side frozen confection slugs FS, each suspended by its respective stick S, are advanced to a position directly above the lateral medial plane of reforming station 20. During the dwell time of the second conveyor belt 42, the vertical racks 98, 98 and carrier blocks 108, 108 cause the extractor bar 44 carrying the side-by-side confection slugs FS to move downwardly until the frozen confection suspended from each stick S is directly between first and second mold halves 52, 54. While the vertical racks 98, 98 dwell in the lowered position, hydraulic cylinders 56 cause first and second mold halves 52, 54 to move toward each other and each pair of mold cavities 78, 78 in first and second mold halves 52, 54 encompass a separate frozen slug FS and reform the frozen slug into reformed frozen confection C.

Next, first and second mold halves 52, 54 are moved apart by the retraction of hydraulic cylinders 56 and vertical racks 98, 98 raise the plurality of shaped assemblies 58 suspended from the respective sticks S in extractor bar 44. When extractor bar 44 is restored to its position in second conveyor belt 42 and the dwell period of second conveyor belt 42 ends, the conveyor belt 42 advances extractor bar 44 to a new position and the side-by-side confection slugs FS suspended from the next adjacent extractor bar are then located directly above reforming station 20. The reforming operation is the repeated.

When the frozen confection forming machine 10 is operate at its normal speed of 14 to 20 operations per minute, the advance and dwell of each extractor bar 44 is approximately three seconds. As the second conveyor belt is advanced rapidly, each extractor bar 44 remains positioned over the lateral medial plane of reforming station 20 for a dwell period of just under three seconds. During this dwell period, the frozen confection slug FS must be lowered, the mold halves 52, 54 must be closed and opened and the extractor bar 44 containing the reformed frozen confection be restored to its normal position for advance to the next position at the end of the dwell period.

During operation of the equipment of the present invention, it has been found that certain ranges of times are required for the various sequences of operations, depending upon the material comprising the confection mixture.

The amount of time required to close the mold halves is a function of the material comprising the confection and the amount of hydraulic pressure provided to hydraulic cylinder 56. It has been found that ice cream containing more solids, e.g., butterfat, sugar solids, etc. require less time to reform than low solid frozen confections such as quiescently frozen water ice. Similarly, products including overrun require less time to reform than non-aerated or quiescently frozen products. Typical times required for the various operations on ice cream, fudge, and on quiescently frozen water ice are set forth in the following table:

| Step | Ice Cream | Fudge | Quiescently Frozen Water Ice |
| --- | --- | --- | --- |
| Total time available for one complete cycle | 4.00 seconds | 4.25 seconds | 4.50 seconds |
| Lowering of frozen confection slugs | 0.80 seconds | 0.80 seconds | 0.80 seconds |
| Closing and dwell of mold halves | 0.90 seconds | 1.15 seconds | 1.40 seconds |
| Opening of mold halves | 0.50 seconds | 0.50 seconds | 0.50 seconds |
| Raising of reformed confection | 0.80 seconds | 0.80 seconds | 0.80 seconds |
| Advance stroke | 1.00 seconds | 1.00 seconds | 1.00 seconds |

In order to assure that reforming occurs within the preferred dwell time, the hydraulic pressure delivered to the hydraulic cylinders is varied. For example, in order to compress frozen confection comprised of ice cream with normal overrun in a machine having eight side-by-side mold cavities, it has been found that a total compressive force of 24,000 pounds or 3,000 pounds per confection produces acceptable product. When quiescently frozen water ice, as an example, is reformed in equipment of the same configuration, higher operating pressure is utilized to provide a compressive force in the range of 3,000 to 5,000 pounds per confection. Such additional force is required to overcome the high resistance of quiescently frozen water ice to reshaping.

Since the actual time required to close the reforming mold halves is a function of several factors including the hydraulic pressure utilized, the temperature of the frozen confection, the nature of the confection, the interrelationship between the shape of the confection slugs FS and the mold cavities, etc., and may vary from one reforming stroke to the next, two mechanisms are provided to initiate the opening of the reforming mold halves in ample time to assure that the reformed confection can be advanced at the completion of dwell time of the second conveyor belt. First, a limit switch (not shown) responsive to the complete closing of the reforming mold halves is utilized to cause the mold halves to reopen as soon as the mold halves have closed completely. Additionally, a timer is provided to reverse the motion of the mold halves in the event that the mold halves have not closed completely (and activated the limit switch) approximately 0.25 seconds before the end of the dwell period.

Typical specifications for liquid confection mixes that can be utilized in conjunction with the equipment and method of the present invention to produce the novel reformed frozen confection products are set forth below. Unless otherwise stated, the specifications are given as percentages by weight of the liquid confection mix.

| Quiescently Frozen Confection | |
| --- | --- |
| Density of Mix | 8.92 lbs/gal. |
| Total Solids | 17.94% |
| Sugar Solids | 11.94% |
| Corn Syrup Solids | 5.11% |
| Citric Acid Solids | 0.32% |
| Overrun | 0% to 10% |
| Flavors | All Natural |
| Color | All Natural |
| Volume of Final Product | Not less than 2.5 fl. oz. |
| Quiescently Frozen Fudge Confection | |
| Density of Mix | 9.54 lbs./gal. |
| Total Solids | 34.13% |
| Sugar Solids | 13.30% |
| Corn Syrup Solids | 3.35% |
| Nonfat Milk Powder | 10.44% |
| Whey Powder | 3.48% |
| Overrun | 0% to 10% |
| Flavors | All Natural |
| Volume of Final Product | 2.5 fl. oz. |
| Vanilla Ice Cream Confection | |
| Density of Frozen Ice Cream | 4.5 to 4.6 lbs./gal. (about 100% overrun) |
| Butterfat content | 10% minimum |

-continued

| | |
|---|---|
| Nonfat Milk Solids (Whey substitution for the total Nonfat Milk Solids may not exceed 25% by weight.) | 10% minimum |
| Flavors | Pure 3/Fold Vanilla |
| Volume of Final Product | Not less than 2.5 fl. oz. |

It is possible to operate the equipment and practice the method of the present invention without utilizing temperature control means associated with the mold halves.

Although the inventions herein have been described with reference to particular embodiments, it is to be understood that these embodiments are merelu illustrative of the principles in application of the invention. Thus, it is to be understood that numerous modifications may be made in the illustrative embodiments and other arrangements may be devised without departing from the spirit and scope of the invention.

What is claimed:

1. In a machine for manufacturing a shaped frozen confection on a stick in a high speed continuous manner having a first machine section including an elemental slug molding means for first forming an individually sized molded elemental slug of frozen confection with a stick projecting therefrom a liquid or semi-solid confection, a second machine section including at least one work station and a second conveyor means for advancing said molded slug of confection by said stick to said at least one work station, the improvement comprising: means for modifying an existing machine as set forth heretofore wherein said means comprises a frozen confection slug reforming station at said at least one work station including a pair of corresponding split mold halves movable from an open position to a closed position adapted to encompass the entire individually sized molded elemental slug of confection when in said closed position, cooperating reforming mold cavities in said reforming mold halves having an opening that substanstially circumscribes the medial cross-section of the individually sized molded confection slug and a volume substantially the same as the volume of said individually sized confection slug, and means for moving said reforming mold halves to said closed position with said reforming mold cavities around said elemental slug of confection under a pressure sufficient to cause said elemental slug of confection to assume the shape of said reforming mold cavity, which is different than the shape of said elemental slug of confection whereby the weight and volume of said shaped frozen confection is substantially the same as the weight and volume of said individually sized molded confection.

2. The machine as recited in claim 1 wherein in a depth of each said reforming mold cavities on said reforming mold halves is less than a distance from said transverse medial cross-sectional area of said individually sized molded confection to an outer surface of said confection.

3. The machine as recited in claim 1 further including temperature control means associated with said mold halves for maintaining the temperature for said mold cavity at a level sufficient to prevent the reformed confection from freezing to said cavity but insufficient to cause substantial melting during reforming.

4. The machine as recited in claim 1, wherein each of said mold halves in said pair of cooperating mold halves includes a stick recess formed at an end of said reforming mold cavity prodimate said stick and said depth of said stick recess is less than said depth of said reforming mold cavity and greater than a thickness of said stick.

5. The machine as recited in claim 1 wherein each surface of said mold halves in said pair of mold halves includes relieved portions remote from said mold cavities.

6. In a machine for manufacturing shaped frozen confections on a stick in a high speed continuous process comprising a first machine section including a plurality of side-by-side substantially identical elemental slug mold strips for first molding a plurality of individually sized side-by-side elemental slugs of confection on a stick from a liquid or semi-solid confection and a second section of said machine including at least one work station and means for advancing said plurality of side-by-side molded elemental slugs by said stick to said at least one work station, the improvement comprising means for modifying an existing machine as set forth heretofore wherein said means comprises a reforming station at said at least one work station having a pair of movable first and second mold halves, means for delivering said side-by-side molded slugs into operative relationship with said mold halves; a corresponding plurality of side-by-side reforming mold cavities in each of said first ad second mold halves each of said reforming mold cavities having an opening the substantially circumscribes the medial cross-section of said confection slug and a volume substantially the same as the volume of said individually sized confection slug and means for moving said mold halves into encompassing relationship to said individually sized molded confection slugs under a pressure sufficient to cause said elemental slugs of confection to assume the shape of said reforming mold cavities which is different than the shape of said molded confection slugs whereby the weight and volume of said shaped frozen confections are substantially the same as the weight and volume of said individually sized molded confection slugs.

7. The machine as recited in claim 6 wherein said reforming mold halves each include temperature control means associated therewith for maintaining the temperature of the plurality of side-by-side mold cavity surfaces at a level sufficient to prevent the reformed confections from freezing to said cavities but insufficient to cause substantial melting during reforming.

8. The machine as recited in claim 6 wherein each side-by-side reforming mold cavity in each of said first and second mold halves is shaped differently than an adjacent reforming mold cavity.

9. The machine as recited in claim 6 wherein said at least one work station further includes means for recycling frozen confection removed from said confection slugs during reforming of said confection slugs at said at least one work station.

10. The machine as recited in claim 6 wherein each of said plurality of side-by-side reforming mold cavities is defined by a projecting circumferential wall around each of said mold cavities and the surface of each of said first and second mold halves is relieved between said circumferential walls.

11. The machine as recited in claim 6, wherein each of said mold halves in said pair of cooperating mold halves includes a stick recess formed at an end of said reforming mold cavity proximate said stick and said depth of said stick recess is less than said depth of said reforming mold cavity and greater than a thickness of said stick.

12. The machine as recited in claim 6 wherein each surface of said mold halves in said pair of mold halves includes relieved portions remote from said mold cavities.

* * * * *